(No Model.) 3 Sheets—Sheet 1.
G. W. JOHNSON.
POTATO DIGGER.
No. 582,209. Patented May 11, 1897.
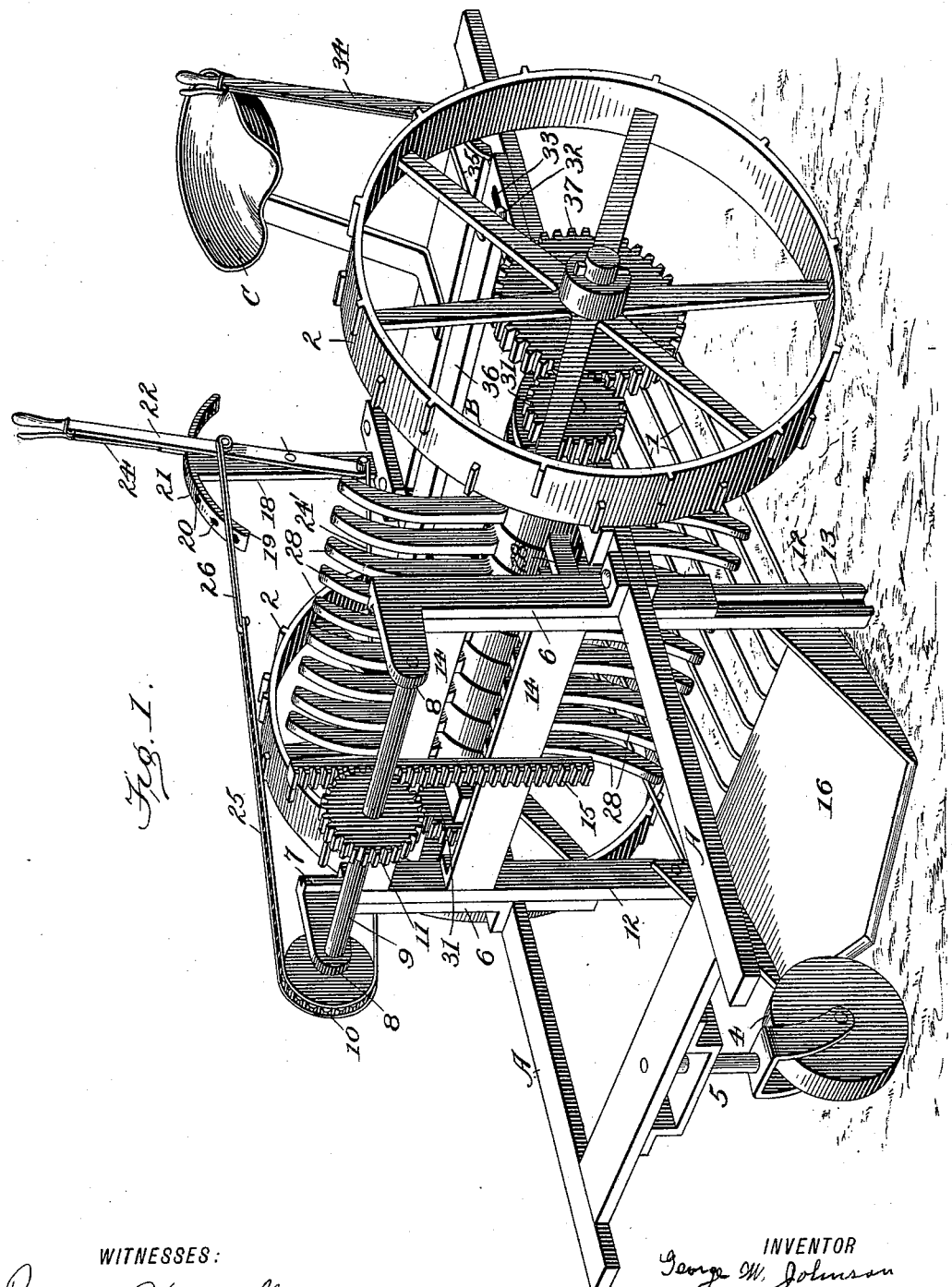
WITNESSES:
Ralph Wormell
Nellie Colclazier
INVENTOR
George W. Johnson
BY
Patrick O'Farrell
ATTORNEY.

(No Model.) G. W. JOHNSON. 3 Sheets—Sheet 2.
POTATO DIGGER.
No. 582,209. Patented May 11, 1897.
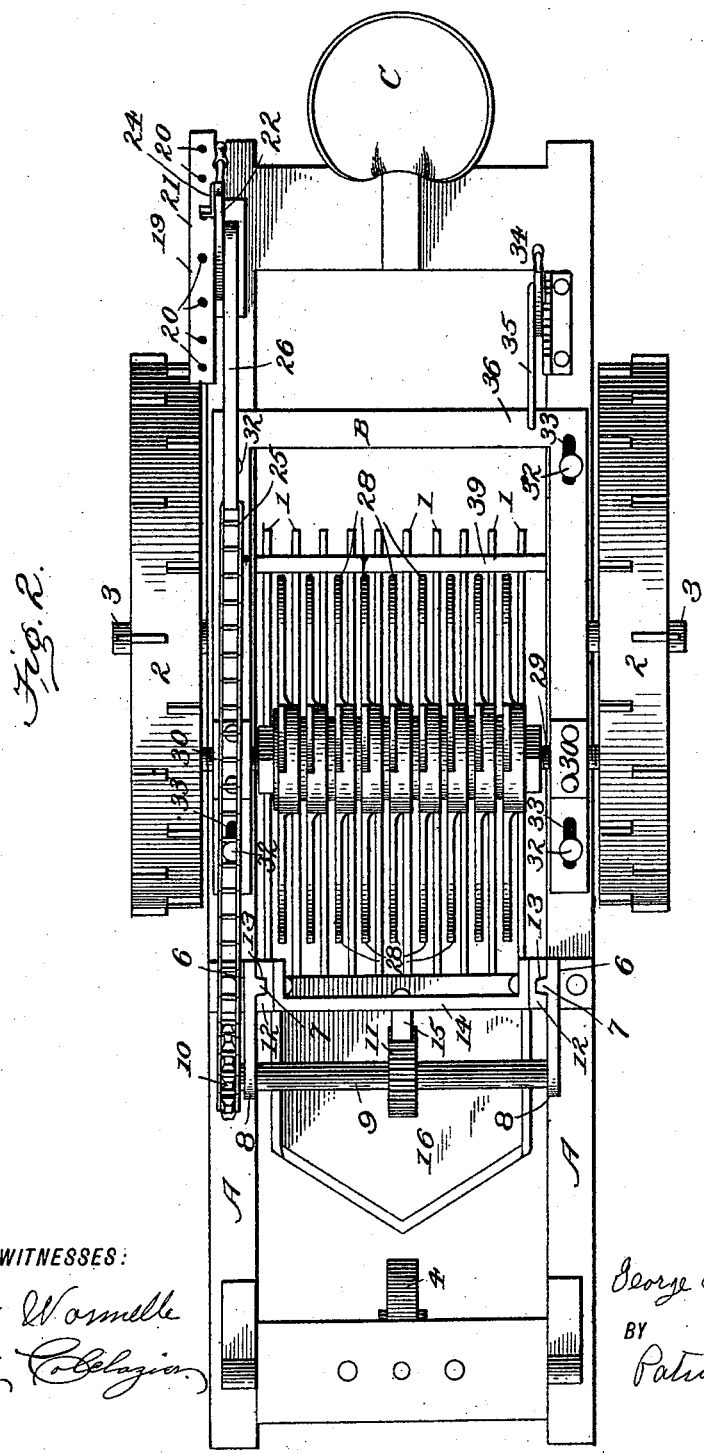
WITNESSES:
Ralph W. Osmelle
INVENTOR
George W. Johnson
BY
Patrick O'Farrell
ATTORNEY.

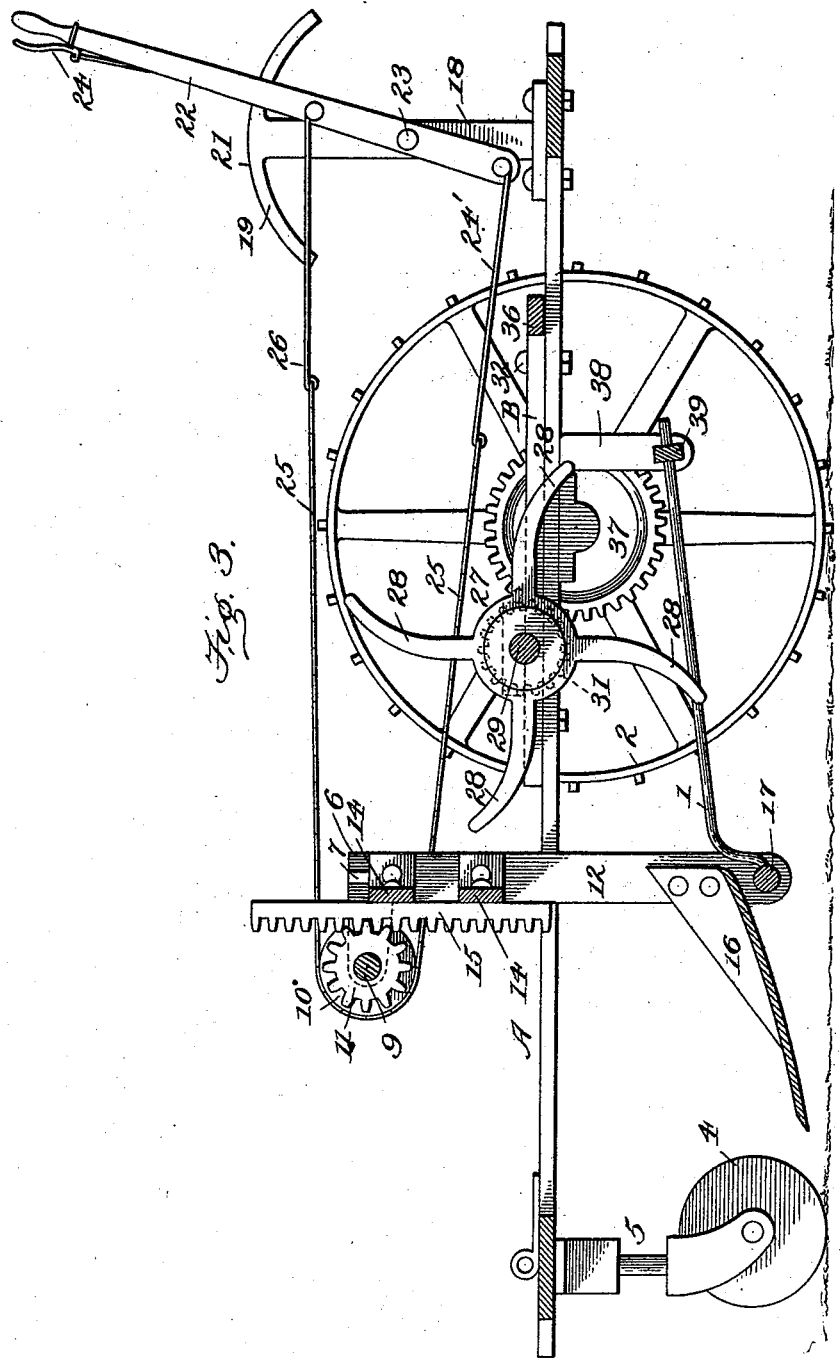

UNITED STATES PATENT OFFICE.

GEORGE WILLARD JOHNSON, OF COUNCIL BLUFFS, IOWA.

POTATO-DIGGER.

SPECIFICATION forming part of Letters Patent No. 582,209, dated May 11, 1897.

Application filed March 10, 1896. Serial No. 582,598. (No model.)

*To all whom it may concern:*

Be it known that I, GEORGE WILLARD JOHNSON, a citizen of the United States of America, residing at Council Bluffs, in the county of Pottawattamie and State of Iowa, have invented certain new and useful Improvements in Potato-Diggers, of which the following is a specification, reference being had therein to the accompanying drawings.

My invention relates to that class of agricultural implements which are used for digging potatoes, and aims to provide a machine which will combine simplicity and durability in its construction.

With these and such other ends in view as result from the specific structure of the implement the invention consists of the novel features and the peculiar construction and combination of the parts, which will hereinafter be more fully described and claimed and which are shown in the annexed drawings, in which—

Figure 1 is a perspective view of the machine embodying the invention. Fig. 2 is a top plan view of the machine. Fig. 3 is a vertical central longitudinal section of the machine.

Similar letters and figures of reference refer to corresponding parts in the several views.

In carrying out the invention I construct a rectangular frame A, upon which are mounted supporting ground-wheels 2, the said ground-wheels being mounted upon the axle 3. The caster-wheel 4 is mounted in a bearing 5 and serves to support the forward end of the frame A and keep it in a horizontal position. An upright standard 6, having the shape of a try-square, and a guide-lug 7 are securely fastened to the horizontal frame A forwardly of the center.

Through the forward ends of the horizontal arms 8 of the upright standard 6 passes the axle 9, upon which are fastened the sprocket-wheel 10 and gear-wheel 11, the use of which will be hereinafter described.

Vertical standards 12, having a groove 13 fitting over the guide-lugs 7, are constructed as shown. To the said vertical standards 12 are attached two parallel bars 14, which hold them in position, and to which is attached the toothed upright 15, the teeth of said upright meshing with the gear-wheel 11, the use of which will be hereinafter described.

To the lower ends of the grooved standards 12 is secured the shovel 16. A standard 17 is fastened to the lower ends of the grooved standards 12, and to which are attached the forward ends of the parallel slats D.

At the rear end of the rectangular frame A is secured the upright standard 18, to the upper end of which is secured the segment 19, having holes 20 through its curved face 21. A lever 22 is pivoted at 23 to the upright standard 18, the said lever being held in the desired position by means of the usual hand-latch 24, the lower portions of which fit into holes 20 of the segment 19. At the lower end of the said lever is pivoted the arm 24, which is attached to the end of the sprocket-chain 25, said sprocket-chain fitting over the sprocket-wheel 10, and, returning, is attached to a similar arm 26. By this arrangement the depth of the shovel can be regulated by operating the lever 22, which causes the sprocket-wheel 10 to revolve by means of the sprocket-chain 25. The revolution of the sprocket-wheel 10 operates the gear-wheel 11, said gear-wheel fitting into the toothed upright 15, thereby raising or lowering the shovel 16.

Situated upon the rectangular frame A is the frame B, which acts as a carriage for the carrier 27, which consists of a drum-like shaft and curved radial fingers 28. The axle 29 is journaled in bearings 30, situated on the carrier B. On the outside of said axle is situated a gear-wheel 31. The carriage B is so arranged as to be thrown in and out of position by sliding on the pins 32, which project through the slots 33. The means of operating the said carriage is by means of the levers 34, which is of the usual hand-latch description, to which is connected at one end the bar 35. The other end of said bar is attached to the cross-bar 36. By this means the gear-wheel 31 is thrown in and out of mesh with the gear-wheel 37, which is integral with and rotates with the ground-wheels 2.

Downwardly from the main frame A projects the standard 38, which supports the cross-bar 39, said cross-bar forming a support for the rear ends of the parallel slats 33.

The driver's seat C is located at the rear of the rectangular frame A, within convenient reach of the hand-levers 34 and 22.

Having thus described my invention, what I claim as new, and desire to secure by Letters Patent, is—

In a potato-digger, the combination of a rectangular frame A, of ground-wheels journaled thereto, and having gear-wheels thereon, a frame B, situated upon frame A, said frames so arranged as to slide upon the pins 32, a drum-like shaft having radial fingers journaled to said frame B, gear-wheels 31, situated on the outside of the axle 29, and engaging with gear-wheels situated upon the ground-wheels, substantially as described.

In testimony whereof I affix my signature in presence of two witnesses.

GEORGE WILLARD JOHNSON.

Witnesses:
G. S. FROGLEY,
A. P. FALK.